July 25, 1939.  J. W. MARSH  2,166,961

TORQUE TRANSMITTING DEVICE

Filed July 16, 1936  3 Sheets-Sheet 1

John W. Marsh
INVENTOR.

BY *Adam Richmond*
ATTORNEYS.

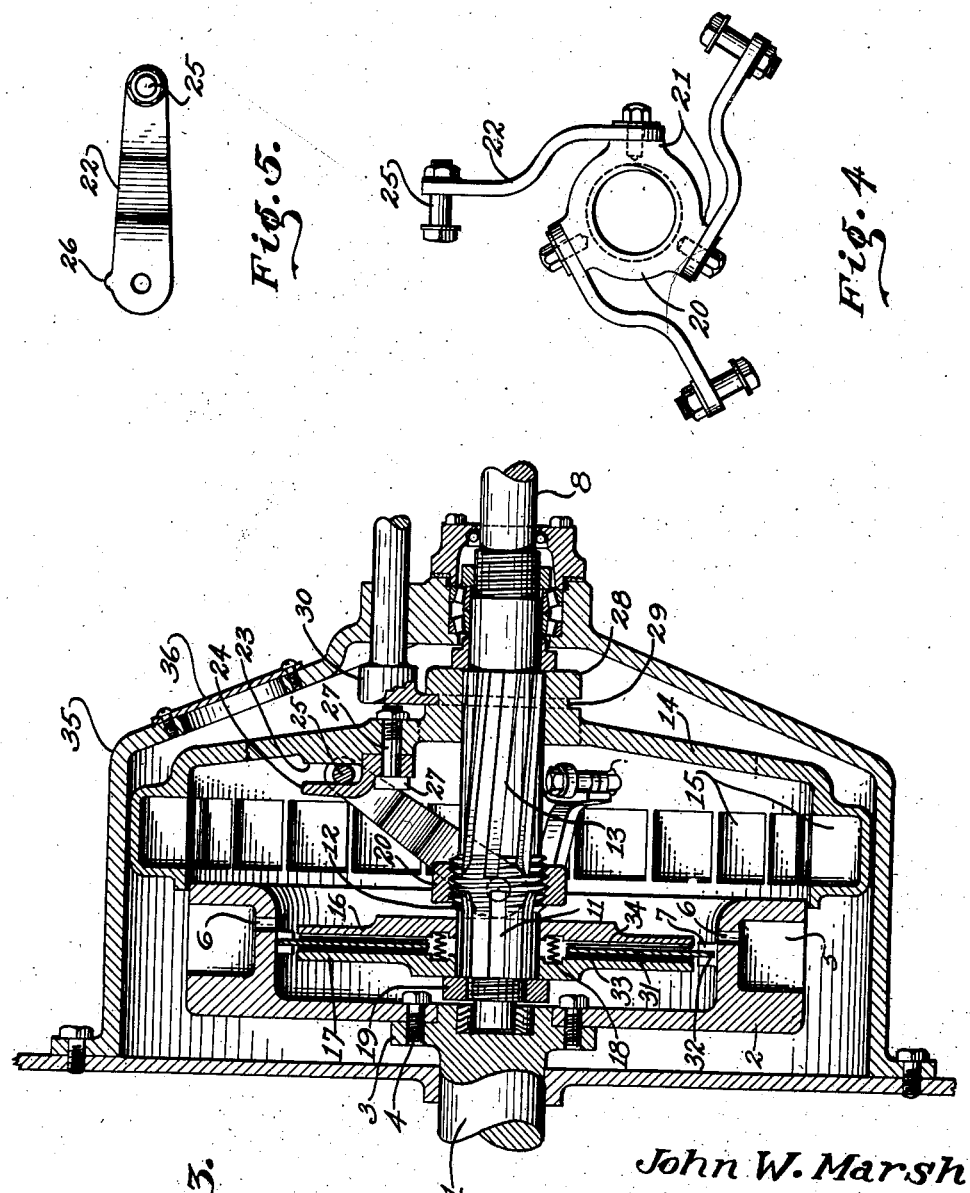

July 25, 1939.  J. W. MARSH  2,166,961
TORQUE TRANSMITTING DEVICE
Filed July 16, 1936  3 Sheets-Sheet 3
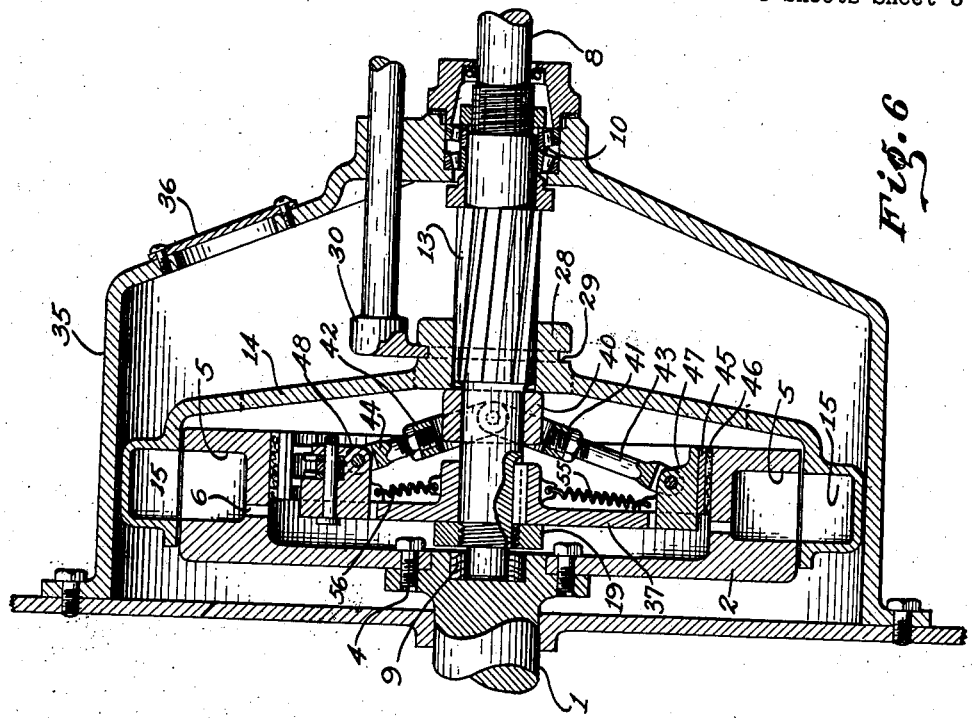
Fig. 6
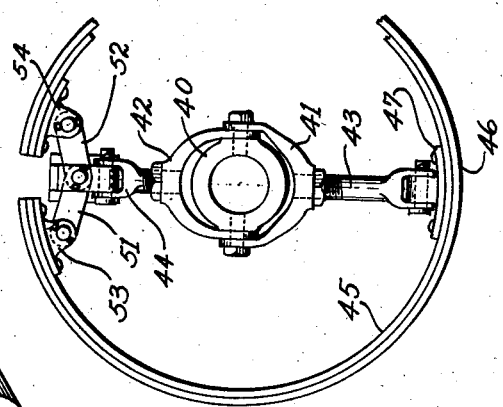
Fig. 7
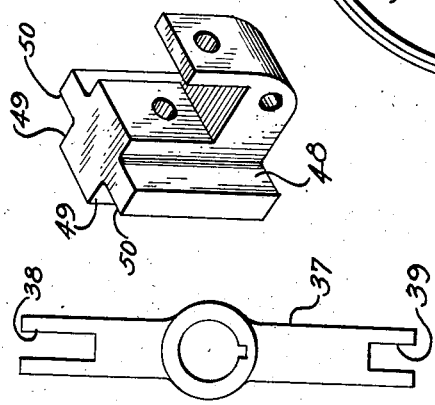
Fig. 9
Fig. 8
John W. Marsh
INVENTOR.
BY *Adam Richmond*
ATTORNEYS.

Patented July 25, 1939

2,166,961

UNITED STATES PATENT OFFICE 2,166,961

TORQUE TRANSMITTING DEVICE

John W. Marsh, Washington, D. C.

Application July 16, 1936, Serial No. 90,938

15 Claims. (Cl. 192—57)

(Granted under the act of March 3, 1883, as amended April 30, 1928; 370 O. G. 757)

This invention described herein may be manufactured and used by or for the Government for governmental purposes, without the payment to me of any royalty thereon.

This invention relates to an improved mechanism for transmitting torque from a prime mover or driving member to a driven member. More particularly, the invention comprehends a dual clutch mechanism including a primary clutch of the fluid or hydraulic type operably associated with a second clutch of the friction type in a manner such that the secondary or friction clutch becomes effective only after complete engagement of the fluid or primary clutch.

One of the objects of the invention is to provide means for the rapid dissipation of energy during periods of excessive slippage between driving and driven clutch members by the use of a fluid clutch, the working fluid of which is circulated through a cooling medium thereby preventing excessive local heating of said fluid.

Another object of the invention is to provide a means for mechanically or frictionally engaging the driving and driven members of a power transmission with a minimum of shock and mechanical wear by delaying operative engagement between the mechanical or frictional surfaces of a mechanical clutch until after a fluid clutch has picked up and is driving the load so that the members of the mechanical clutch are required only to pick up that fraction of the total load represented by the difference in speed between the driving and driven members of the fluid clutch due to the inherent slippage characteristics of the fluid clutch.

Another object of this invention is to provide means for controllably transmitting any amount of driving torque regardless of the relative rotational speeds of the driving and driven members by manually controlling partial or complete engagement of the driven member with the driving member of the fluid clutch.

Another object of this invention is to eliminate the characteristic low speed drag, common to fluid clutches, by providing means for complete disengagement between the driving and driven members of the fluid clutch.

A further object of this invention is to provide a clutch mechanism in which the gripping action or torque transmitting force is directly proportional to the torque transmitted.

A still further object of this invention is to provide means for automatic release of the connection between the driving and driven members when the speed of the driven member exceeds that of the driving member, thereby preventing damage to the driving member or prime mover due to excessive speed.

The clutch mechanism of this invention is designed particularly for use in instances where it is necessary to apply the rotational torque of the prime mover to the static resistance of the load thereby requiring the dissipation of energy in the clutch until the speed of the load corresponds with the speed of the prime mover. A typical example of a power transmission of this character and one to which the clutch mechanism of the present invention is admirably suited is that of an automotive vehicle wherein each time the vehicle is started the clutch mechanism is called upon to dissipate energy by slippage in an amount proportional to the difference in speed between the vehicle drive shaft and the drive shaft of the prime mover. When the weight of the vehicle is great, relative to the power of the engine, the time required to accelerate the vehicle to the speed corresponding to the speed of the engine is sufficient to require the dissipation of a large amount of energy with consequent excessive heating and wear on the clutch. The degree of slippage of the clutch parts is controlled by partial engagement thereof, but the partial engagement of the clutches heretofore used is difficult to regulate, and results in the dissipation of a larger amount of energy than necessary, or slippage of the driving wheels. The former increases the heating and wear on the clutch. The latter requires the power to be shut off and reapplied as the coefficient of friction between the wheels and rails or ground is substantially reduced when slippage occurs.

Previous inventions have sought to provide for smooth acceleration of the load and dissipation of energy by use of fluid clutches. These devices have had at least three characteristic defects which have prevented their general adoption. First, they have lacked controllability; the torque transmitted was a function of the square of the speed of the driving member, controlled only by speed of said member. Second, no provision has been made for the complete separation of the driving and driven members, and a drag on the driven member always existed at low speed caused by the centrifugal action of the fluid against the driven member, and it was impossible to stop the driven member except by provision of a separate brake on that member or provision to disconnect the driven member from the driving shaft. Third, slippage always occurred between driving and driven members regardless of the speed of the driving member. This was caused by the leakage of the fluid between the driving and driven members, compressibility of the fluid and lack of mechanical connection. This resulted in reduced efficiency and the necessity for a provision to dissipate the heat generated in continuous operation.

Friction clutches have been used in the typical application referred to, but not only have they failed to successfully solve the aforesaid problems of heat, wear and regulation, but they present an added difficulty in that the load is firmly connected to the engine so that during periods when the vehicle is coasting, the vehicle was permitted to drive the engine which, particularly in the lower gear ratios, resulted in harmful and sometimes destructive effects on the engine by overspeeding. Most attempts to correct this have included an independent over-running clutch which has not been developed in sufficient capacity as to be satisfactory for heavy vehicles.

To attain the aforesaid objects and overcome the difficulties experienced in the past, I have provided a centrifugal action fluid clutch with the driven member capable of complete disengagement and partial or complete engagement with the driving member, and combined therewith a friction clutch which becomes automatically engaged after full engagement of the fluid clutch, thereby eliminating the slip of the fluid clutch under full load. Moreover, I have provided that the movement of the driven member and the friction clutch be such that these members will be brought into engagement as the load transmitted is increased and will be thrown out of engagement when the speed of the driven member exceeds that of the prime mover.

Other objects and features of this invention will become apparent and more clearly understood from the following specification when considered in connection with the accompanying drawings, wherein I have illustrated preferred embodiments of the invention. It is to be understood, however, that these drawings are to be considered as illustrative rather than in a limiting sense, the important and novel features of the invention being pointed out more particularly in the appended claims.

In the accompanying drawings:

Fig. 3 is a longitudinal sectional view of the clutch showing the parts in a disengaged position.

Fig. 4 is a structural detail of the clutch collar and shifting finger assembly of the friction clutch.

Fig. 5 is a detail view of a friction clutch finger.

Fig. 6 is a longitudinal sectional view of a modified form of my invention showing the clutch parts in engaged position.

Fig. 7 is a fragmental elevation of the friction clutch band and operating mechanism therefor of the clutch shown in Fig. 6.

Fig. 8 is a detail view of the drive arm for the friction clutch of Fig. 6.

Fig. 9 is a perspective view of the block used to transmit the force to the toggle mechanism included in the operating mechanism of the clutch in Fig. 6.

Figure 1:
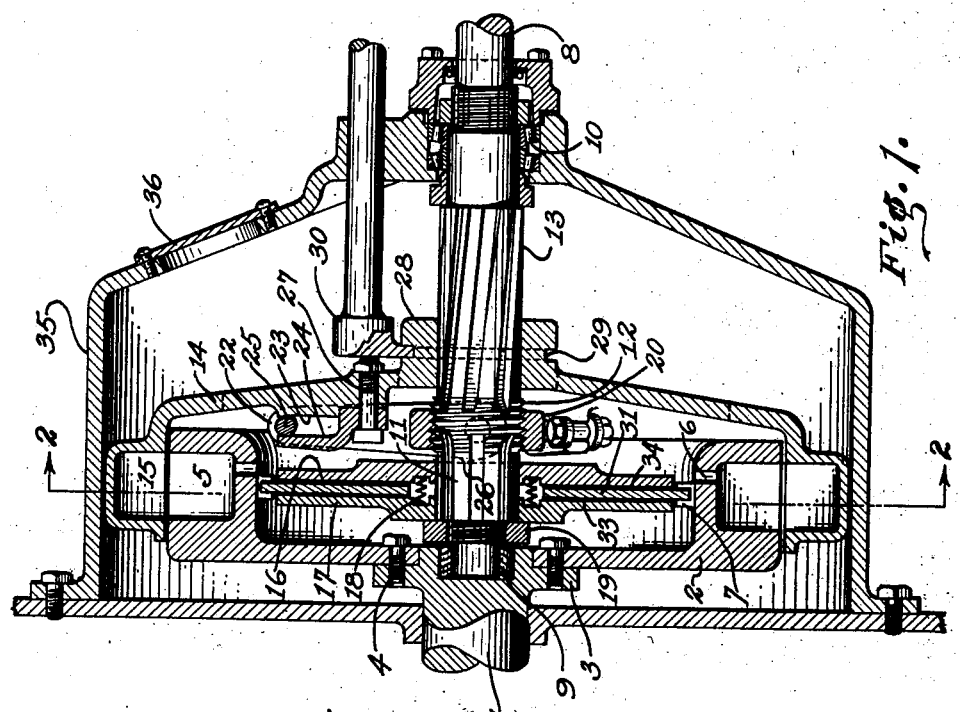
Fig. 1 is a longitudinal sectional view of my improved clutch mechanism showing the parts in engaged position.

Referring more particularly to the accompanying drawings, the reference numeral 1 is used to indicate generally a shaft associated with a prime mover (not shown) and upon which is mounted a fly-wheel 2 usually associated with such prime mover shafts, and which in this case is used as the driving member of the clutch mechanism. The driving member is secured to the drive shaft 1 by means of a flange 3 and screw bolts 4.

The fly-wheel 2 is provided with an axially rearwardly extending rim section in which is formed a peripheral series of fluid buckets or pockets 5 each of which has a hole or duct 6 communicating with the central recessed portion of the driving member. A driven shaft 8 is provided and is suitably supported in alignment with the driven shaft 1 by bearing members 9 and 10. The driven shaft 8 is provided with a spirally or helically splined section 13 upon which is mounted a driven clutch member 14, said member forming with the driving member 2 the driving and driven members of the fluid clutch mechanism hereinbefore referred to. The clutch member 14 comprises a splined hub 28, which is mounted on the section 13 of the shaft 8, and radially extending spokes 60 which join said hub 28 with an axially forwardly extending rim section which telescopes around the rim section of the clutch member 2 and is provided with a complemental peripheral series of fluid buckets or pockets 15. The hub 28 of the driven clutch member 14 is provided with an annular groove 29 to receive a shifting fork 30.

It is to be noted from an inspection of Fig. 1 of the drawings that the clutch members 2 and 14 cooperate in a manner to define an inner central recess or compartment within which is disposed the clutch elements of an auxiliary or secondary friction clutch. To this end the driven shaft 8 near its extremity is provided with a series of longitudinally disposed splines 11 upon which are mounted one set of friction clutch disks 16 and 17. The disks 16 and 17 are provided with teeth or splines which engage the splined portion of the driven shaft to prevent relative rotation between the shaft and disks in the usual manner. The disks 16 and 17 of the friction clutch are disposed on opposite sides of and engage opposite faces of an intermediate driving clutch disk 31 which has a peripheral series of teeth or splines 32 which operatively engage and mesh with a cooperating series of teeth or splines 7 provided on the inner periphery of the rim section of the driving clutch member 2. The clutch disks 16 and 17 at the inner periphery are provided with a series of pockets or recesses designed to support and house a series of coil springs 18 for the purpose of maintaining the disks normally spaced and out of engagement with the cooperating driving faces of the drive disk 31. The separation of the disks 16 and 17 is limited by the engagement of the faces of these members with a shaft nut 19 located at the forward end of the longitudinal splines 11 and a threaded collar 20 (hereinafter described) located at the rearward end of the said longitudinal splines 11 of the driven shaft 8. The driving clutch plate 31 is provided on its opposite sides with friction surfaces 33 and 34 for engaging the disks 16 and 17.

Referring to Figures 3, 4, and 5 of the drawings, it is to be noted that the driven shaft 8 is provided with a raised threaded section 12 disposed between the longitudinal splines 11 and the helical splines 13. A threaded collar 20 mounted on the threaded portion 12 is provided with a series of projections 21 for rotatably mounting a series of friction clutch operating fingers 22. Each friction clutch operating finger 22 is provided with a protuberance 26 near the end attached to the threaded collar 20 and also provided with a pin 25 at the other end of said friction clutch finger. The inner web portion of the driven member 14 is provided with a plurality of surfaces 23 so arranged with a plurality of lugs 24 to provide recesses to receive the pins 25 of the friction clutch fingers 22 and control the movement of said fingers when the driven clutch member 14 is moved longitudinally on the driven shaft 8. The lugs 24 are secured to the driven clutch member 14 by bolts 27.

A fluid-tight housing 35 encloses the entire clutch mechanism and provides a container for the operating fluid. A hand hole and a cover plate 36 are provided in the housing 35.

With reference to the alternate construction shown in Figures 6, 7, 8, and 9, the same reference numbers are used to indicate the parts common to both constructions. A drive arm 37 is keyed to the driven shaft 8, and provided with bifurcated ends 38 and 39. A collar 40 is loosely mounted on the driven shaft 8 between the driving arm 37 and the fluid driven member 14. The collar 40 has pivotally secured to it yokes 41 and 42. The yokes 41 and 42 carry, respectively, members 43 and 44 in a manner to provide for suitable adjustment thereto. A split spring band 45, having secured thereto a suitable frictional surface 46, is mounted in a position for engagement with a clutch drum provided on the inner periphery of the rearwardly extending thickened rim section of the driving clutch member 2. A shoe 47 is secured to the split spring band 45 at or near its central portion and is slidably mounted in the bifurcated part 39 of the drive arm 37. The shoe 47 is pivotally secured to the member 43 in a manner which will produce a toggle action as hereinafter described. A block 48, having a plurality of surfaces 49 and 50, is pivotally secured to the member 44 and is slidably mounted in the bifurcated part 38 of the drive arm 37. The shoe 47 is provided with surfaces similar to the surfaces 49 and 50 of the block 48. The block 48 and the shoe 47 are pivotally secured to the members 44 and 43 respectively in such a manner as to produce a toggle action. A pair of shoes 53 and 54 are secured to the ends of the split spring band 45 and said shoes are pivotally connected to the block 48 by a pair of secondary toggle arms 51 and 52. A pair of tension springs 55 and 56, having one of the ends of each spring secured near the hub portion of the drive arm 37 while the other ends of the said springs are attached respectively to the members 47 and 48, and normally hold the split spring band in a retracted position.

In the operation of this clutch mechanism it is essential that the housing 35 contain a quantity of fluid sufficient to submerge the lower pockets and extend above the lower part of the inner periphery of the driving member 2. During the rotation of the prime mover and the driving member 2, the fluid in housing 35 will flow by centrifugal action through the holes 6 into the pockets 5 and be thrown by centrifugal action against the pockets 15 a force equal to the centrifugal force of the weight of the fluid contained in the pockets 5 thereby causing the driven member 14 and the driven shaft 8 to rotate.

Referring to Figure 3 which shows the clutch in its disengaged position, it will be noted that the fluid driven member 14 is completely removed from operative relation with respect to the fluid driving member 2. The fluid driving member 2, which in this application is incorporated in the flywheel of the prime mover, is rotating at engine speed. On movement of the shifting fork 30 towards the prime mover, the fluid driven member 14 is gradually brought into operative or driving relation with the fluid driving member 2 so that the oil being thrown from the pockets 5 in the fluid driving member 2 contacts the inner walls of the pockets 15 in the fluid driven member 14 and exerts tangential force thereon. The position of the fluid driven member 14 may be adjusted at any point in relation to the fluid driving member 2 according to the torque desired.

It will be noted that the splines 13 are arranged helically on the driven shaft 8, so that the resistance of the shaft 8 to rotation will tend to draw the fluid driven member 14 into closer driving relation with driving member 2. Thus, when the fluid driven member 14 is only partially engaged, the torque exerted is comparatively small; the force tending to advance the fluid driven member 14 towards the prime mover is likewise small and readily controlled by the shifting fork 30.

Referring still to Figure 3, it will be noted that the friction clutch members 16, 17, and 31 are disengaged, the driven members 16 and 17 thereof being held apart by the springs 18. The longitudinal motion of the frictional driven members 16 and 17 is, however, restricted by the engagement of the faces of these members with the threaded collar 20 and the shaft nut 19 respectively. When the fluid driven member 14 has been moved into completed driving relation with the fluid driving member 2 as shown in Figure 1, all of the tangential force of the oil from the pockets of the fluid driving member 2 is being exerted against the fluid driven member 14 which will then be rotating at a speed slightly less than that of the driving member 2 because of the slipping characteristics of the fluid clutch. In this position the clutch fingers 22 are raised to the position shown in Figure 1 and the protuberances 26 bear on the friction clutch disk 16, forcing the driven clutch disks 16 and 17 into contact with the friction surfaces 33 and 34 of driven clutch disk 31. When the fluid driven member 14 is in this position, a large proportion of the driving torque is being exerted on the driven member so that the force tending to advance the driven member towards the driving member is increased. This force, multiplied by the leverage of the clutch levers or fingers 22 and the cam action due to the location of the protuberances 26, exerts sufficient force on the driving disks 16, 17, and 31, to take up the slip between driving member 2 and driven member 14 and to frictionally transmit the full driving torque.

Figure 2:
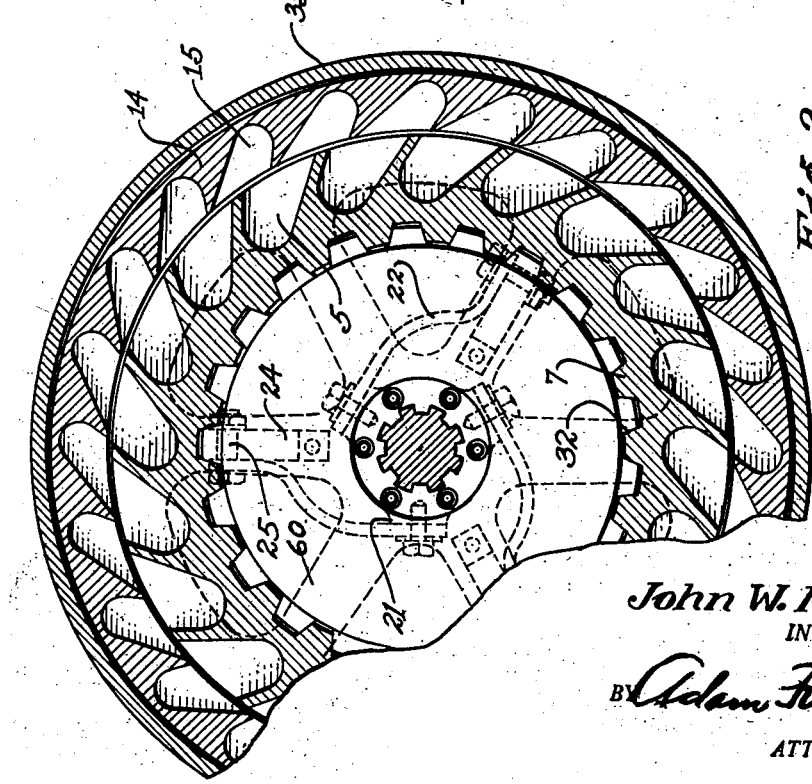
Fig. 2 is a transverse sectional view taken on the line 2—2 of Fig. 1.

Adjustment for possible wear on the frictional surfaces is accomplished by removing the lugs 24 through the open spaces between the spokes 60 of the clutch member 14 (see Fig. 2) and the hand hole 36 and rotating the collar 20 with its associated parts on the raised threaded portion 12 to advance protuberances 26 of the fingers 22 toward the clutch disk 16.

Referring to the alternate construction shown in Figures 6, 7, 8, and 9, it will be readily understood that when the fluid driven member 14 is in its engaged position, it will through the action of the helical splines 13 exert a longitudinal thrust on the collar 40 towards the driving member 2. Such longitudinal thrust exerted through the yokes 41 and 42 and members 43 and 44 will produce a toggle action on the shoe 47, at the central portion of the split spring band 45, and cause the frictional surface 46 to contact the inner periphery of the driving member 2, and simultaneously, through a secondary toggle action, the toggle arms 51 and 52 will spread the shoes 53 and 54 and ends of the split spring band 45 and the friction surface 46 so that the entire friction surface 46 will be in contact with the inner periphery of the driving member 2, with sufficient force to frictionally transmit the full driving torque.

Adjustment for possible wear on the frictional surfaces is accomplished by adjusting the members 43 and 44 with respect to their respective yokes 41 and 42.

It will be noted that the helical arrangement of the splines 13 also causes a force to act on the driven member 14 away from the driving member 2 when the resistance of the driven shaft 8 is lowered sufficiently to permit it to overrun the prime mover or driving member 2, so that the driven members will be thrown into disengagement. This action will automatically disengage the clutch when the throttle of the prime mover is closed.

In the sequential operation of the primary hydraulic clutch members and the secondary friction clutch members during the coupling of the driving shaft and the driven shaft, the engagement of the secondary friction clutch member is begun at the completion of the movement of the primary hydraulic clutch members into the position of driving relation; and in the reverse operation, or that of uncoupling the driving shaft and the driven shaft, the movement of the primary hydraulic clutch members out of the position of driving relation with each other is begun at the completion of disengagement of the secondary clutch members.

Although I have illustrated two applications of a friction clutch in combination with a fluid clutch, it is obvious that the principles of this invention may be employed in the application of various forms of equalizing, self-energizing or other devices used in connection with friction and mechanical clutches, and with many other forms of friction and fluid clutches. As far as the operative principle is concerned, the problem is merely one of combining the friction clutch or other mechanical gripping device with a fluid clutch in such a way that the friction clutch or its equivalent is brought into engagement at or near the point of full engagement of the fluid clutch. This invention, therefore, contemplates such structural modifications as are necessary to embody the principles herein set forth in suitable combinations of fluid and friction clutches.

Having described my invention, what I claim as new and wish to secure by Letters Patent is:

1. A fluid operated torque transmitting mechanism including a fluid-tight casing adapted to contain a working fluid, a centrally recessed driving member having in its outer periphery a series of outwardly opening pockets, radially extending intake fluid ducts connecting the recessed portion of said driving member with said pockets, a driven member surrounding the driving member and having in its inner periphery a series of inwardly opening pockets, said outwardly and inwardly opening pockets being so arranged that the rotation of the driving member will cause the fluid contained within its pockets to be thrown tangentially into the opposing pockets of the driven member.

2. A fluid operated torque transmitting mechanism including a fluid-tight casing adapted to contain a working fluid, a centrally recessed driving member having in its outer periphery a series of outwardly opening pockets, radially extending intake fluid ducts connecting the recessed portion of said driving member with said pockets, a driven member surrounding the driving member and having in its inner periphery a series of inwardly opening pockets, said outwardly and inwardly opening pockets being so arranged that the rotation of the driving member will cause the fluid contained within its pockets to be thrown tangentially into the opposing pockets of the driven member, said driving and driven members being mounted for relative axial displacement with respect to each other and means for relatively moving the driving and driven members axially.

3. A fluid operated torque transmitting mechanism including a fluid-tight casing adapted to contain a working fluid, a centrally recessed driving member having in its outer periphery a series of outwardly opening pockets, radially extending intake fluid ducts connecting the recessed portion of said driving member with said pockets, a driven member surrounding the driving member and having in its inner periphery a series of inwardly opening pockets, said outwardly and inwardly opening pockets being so arranged that the rotation of the driving member will cause the fluid contained within its pockets to be thrown tangentially into the opposing pockets of the driven member, said driven member mounted for axial displacement with respect to the driving member, and means for moving the driven member axially with respect to the driving member.

4. A fluid operated torque transmitting mechanism including a fluid-tight casing adapted to contain a working fluid, a circular driving member having in its outer periphery a series of outwardly opening pockets, a driven shaft, a driven member mounted on said shaft provided with a laterally extending periphery having a series of inwardly opening pockets, said inwardly opening pockets being so arranged that the rotation of the driving member will cause the fluid contained within its pockets to be thrown tangentially into the opposing pockets of the driven member, said driven member and driven shaft being provided with cooperating splines, said splines being so arranged as to provide for axial displacement of the driven member with respect to the driving member, and means for moving the driven member axially on said splines with respect to the driving member.

5. A fluid operated torque transmitting mechanism including a fluid-tight casing adapted to contain a working fluid, a driving member having in its outer periphery a series of outwardly opening pockets, a driven shaft, a driven member mounted on said shaft, said driven member surrounding the driving member and having in its inner periphery a series of inwardly opening pockets, said outwardly and inwardly opening pockets being so arranged that the rotation of the driving member will cause the fluid contained within its pockets to be thrown tangentially into the opposing pockets of the driven member, said driven member and driven shaft being provided with cooperating helical splines, the said helical splines providing for a rotating axial displacement of the driven member with respect to the driving member, and means for effecting the rotary axial displacement of the driven member on the said helical splines with respect to the driving member.

6. A fluid operated torque transmitting mechanism including a fluid-tight casing and comprising a driving member having in its outer periphery a series of outwardly opening pockets, a driven shaft, a driven member mounted on said driven shaft, said driven member surrounding the driving member and having in its inner periphery a series of inwardly opening pockets, said outwardly and inwardly opening pockets being so arranged that the rotation of the driving member will cause the fluid contained within its pockets to be thrown tangentially into the opposing pockets of the driven member, said driven member and driven shaft being provided with helical splines for automatic rotary axial engagement with and separation from the driving member, said automatic axial movement being effected by the fluid drag between the driving and driven members and said helical splines of the driven shaft.

7. A fluid operated torque transmitting mechanism including a fluid-tight casing and comprising a driving member having in its outer periphery a series of outwardly opening pockets, a driven member surrounding the driving member and having in its inner periphery a series of inwardly opening pockets, said outwardly and inwardly opening pockets being so arranged that the rotation of the driving member will cause the fluid contained within its pockets to be thrown tangentially into the opposing pockets of the driven member, said driving and driven member defining a central recess, small holes or ducts in the fluid pockets of the driving member communicating with the said central recess to provide passages for the entrance of operating fluid into the said fluid pockets.

8. In a clutch structure, in combination a fluid clutch, a friction clutch having a disk directly associated with the driving member, a driven shaft provided with longitudinal splines, two opposing pressure disks slidably mounted thereon and associated with the driven member, a threaded collar mounted on the driven shaft, camming fingers pivoted on said threaded collar adapted to operatingly engage said pressure plates to urge the same together, said threaded collar being axially movable by rotation about the threaded portion of the drive shaft thereby providing means for adjusting the cam action.

9. In a clutch structure, in combination, a fluid clutch, a friction clutch having a friction disk associated with the driving member, a driven shaft provided with longitudinal splines, opposing pressure disks slidably mounted thereon and associated with the driven member, a threaded collar mounted on the driven shaft, camming fingers pivoted on said threaded collar and operatively engaging said pressure disks to urge the same together, the other end of said camming fingers being connected with the driven member of the fluid clutch.

10. In a clutch structure, in combination, a fluid clutch, a friction clutch including a driving member and a driven member, said driven member comprising a split spring band having a suitable friction surface, a driven shaft, a collar slidably mounted on the driven shaft, adjustable links connecting the split spring band and the collar, a clutch drum formed on the inner periphery of a rim section of the driving member, the said slidable collar and links providing a toggle means for expanding the split spring band, to thereby effect engagement of the latter with said clutch drum of the driving member.

11. In combination, a driving and a driven shaft and a clutch mechanism therefor, comprising a primary fluid clutch including an impeller directly associated with the driving shaft, a rotor telescoping said impeller and axially movable into and out of driving relation therewith on splines of the driven shaft, a secondary friction clutch operatively coupled to said driving and driven shafts and means for operatively connecting said clutches whereby the secondary friction clutch is engaged only at the point of completion of the driving relation of the impeller and rotor of the primary fluid clutch.

12. In combination, a driving and a driven shaft and a clutch mechanism therefor, comprising a primary fluid clutch including an impeller directly associated with the driving shaft and a rotor telescoping said impeller and axially movable into and out of driving relation therewith on splines of the driven shaft, a secondary friction clutch operatively coupled to said driving and driven shafts, means for progressively engaging and disengaging said fluid and friction clutches.

13. A fluid operated torque transmitting mechanism including a fluid-tight casing and comprising a driving member having in its outer periphery a series of outwardly opening pockets, a driven member, a driven shaft for said driven member, said driven member surrounding the driving member and having in its inner periphery a series of inwardly opening pockets, said outwardly and inwardly opening pockets being so arranged that the rotation of the driving member will cause the fluid contained within its pockets to be thrown tangentially into the opposing pockets of the driven member, said driven member and driven shaft being provided with cooperating helical splines, and a means in operative engagement with said driven member for producing a rotary axial displacement of the driven member with respect to the driving member on said helical splines for producing engagement and separation of said driving and driven members.

14. In combination, a driving and a driven shaft, and a clutch mechanism therefor, comprising a primary fluid clutch including an impeller directly associated with the driving shaft and a rotor telescoping said impeller capable of rotary and axial movement on said driven shaft, a secondary friction clutch connecting said driving and driven shafts, means for producing initial engagement and disengagement of said clutches, a helical spline connection between the driven member and the driven shaft for automatically controlling progressive engagement and disengagement of said clutches, and means for causing the initial engagement of the driven and driving members of the fluid clutch.

15. A torque transmitting mechanism comprising telescopic hydraulic driving and driven members, normally out of driving relation, means adapted to effect telescopic coupling of said hydraulic members to bring them into driving relation, frictionally operated driving and driven members normally out of driving relation and means controlled by one of said hydraulic members and coacting with one of said friction members to bring the friction members into driving relation after the hydraulic member has been telescoped sufficiently to establish a driving relation therebetween, and to effect the disengagement of said friction members before the driving relation between the hydraulic members has been disrupted.

JOHN W. MARSH.